United States Patent [19]

Hozumi et al.

[11] Patent Number: 4,534,381
[45] Date of Patent: Aug. 13, 1985

[54] ELECTROMAGNETIC VALVE

[75] Inventors: Kazuhiro Hozumi; Shigeo Tamaki, both of Asahi, Japan

[73] Assignee: Kuroda Seiko Company Limited, Kanagawa, Japan

[21] Appl. No.: 562,417

[22] Filed: Dec. 16, 1983

[30] Foreign Application Priority Data

Dec. 30, 1982 [JP] Japan ............................ 57-197987[U]
Dec. 30, 1982 [JP] Japan ............................ 57-197988[U]

[51] Int. Cl.³ ........................ F16K 31/06; F16K 11/02
[52] U.S. Cl. ............................ 137/625.65; 137/625.44; 251/129.20; 251/129.03
[58] Field of Search ...................... 137/625.44, 625.65; 251/138, 129, 30, 130

[56] References Cited

U.S. PATENT DOCUMENTS 3,102,712  9/1963  Zilk .................................. 251/138 X
3,971,542  7/1976  Lee, III ............................. 251/30 X
4,180,234  12/1979  Hertfelder ......................... 251/30 X
4,326,696  4/1982  Ishikawa et al. ............ 137/625.65 X Primary Examiner—Arnold Rosenthal
Attorney, Agent, or Firm—Koda and Androlia

[57] ABSTRACT

An electromagnetic valve including an electromagnetic unit having a magnetic core, a coil bobbin arranged around the core, an electromagnetic coil wound around the bobbin, a stationary yoke and a first valve seat formed in a flange of the coil bobbin and a valve unit having a movable yoke, a valve stopper provided at an end of the movable yoke whose other end is rotatably coupled with the stationary yoke and a second valve seat provided in opposition to the valve stopper. When the coil is not energized, the valve stopper is resiliently urged against the second valve seat and a first fluid passage connected to the first valve seat is communicated with a valve chamber in the valve unit, but when the coil is energized, the movable yoke is attracted to the core to urge the valve stopper against the first valve seat and a second fluid passage connected to the second valve seat is communicated with the valve chamber.

8 Claims, 4 Drawing Figures

ELECTROMAGNETIC VALVE

BACKGROUND OF THE INVENTION

The present invention relates to an electromagnetic valve comprising an electromagnetic unit having a magnetic core, a coil bobbin arranged around the core, an electromagnetic coil wound around the coil bobbin, and a stationary yoke having one end connected to one end of the core, and a valve unit having a movable yoke arranged movably inside a valve chamber and having one end rotatably coupled with the other end of the stationary yoke, a valve stopper provided on the other end of the movable yoke, and two valve seats arranged opposite to the valve stopper and communicated with fluid passages.

The electromagnetic valve mentioned above has been known and widely used in various applications. In the known electromagnetic valve, the two valve seats are arranged in the valve unit and thus the construction of the valve unit becomes very complicated and the size of the valve unit is liable to be large. Further, the connection between the electromagnetic unit and valve unit becomes also complicated and the adjustment is very critical. Therefore, it is difficult to manufacture the electromagnetic valve in a simple and less expensive manner.

SUMMARY OF THE INVENTION

The present invention has for its object to provide an electromagnetic valve which can overcome the drawbacks of the known electromagnetic valve and can be made simple in construction and cheap in cost.

It is still another object of the invention to provide an electromagnetic valve in which influence of errors in dimension of various elements in relation to a stroke of a movable yoke can be effectively eliminated.

It is still another object of the invention to provide en electromagnetic valve in which readjustment can be carried out in a simple and accurate manner.

According to the invention, an electromagnetic valve comprises an electromagnetic unit having a magnetic core, a coil bobbin arranged around the core, an electromagnetic coil wound around the coil bobbin, a stationary yoke having one end connected to one end of the core, a first valve seat formed in a flange of the coil bobbin and a first fluid passage communicated with the first valve seat; and a valve unit including a movable yoke arranged within a valve chamber and having one end rotatably coupled with the other end of the stationary yoke, a valve stopper provided in the other end of the movable yoke at a position opposed to the first valve seat, a second valve seat provided opposite to the valve stopper, a second fluid passage communicated with the second valve seat, a third fluid passage communicated with the valve chamber and a resilient member for urging the valve stopper against the second valve seat to communicate the first fluid passage with the valve chamber, when the electromagnetic coil is de-energized; whereby when the electromagnetic coil is energized, the movable yoke is attracted to the core and the valve stopper is urged against the first valve seat to communicate the second fluid passage with the valve chamber.

DESCRIPTION OF THE PREFERRED EMBODIMENTS

Figure 1:
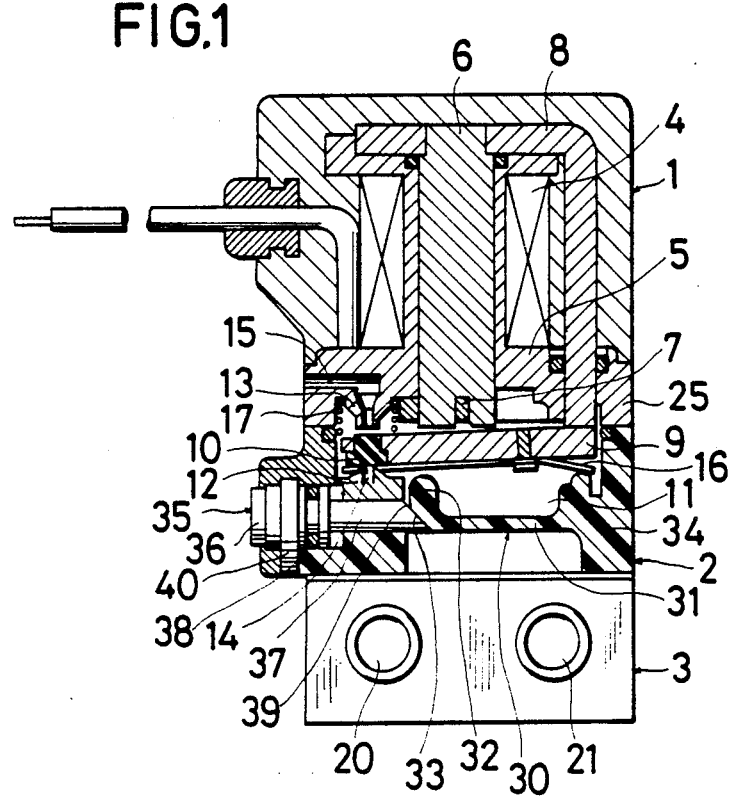
FIG. 1 is a cross section showing an embodiment of the electromagnetic valve according to the invention under a de-energized condition.

FIG. 1 is a cross section illustrating an embodiment of the electromagnetic valve according to the present invention. The valve comprising an electromagnetic unit 1, a valve unit 2 and a base unit 3. The electromagnetic unit 1 includes a fixed magnetic core 6, a coil bobbin 5 arranged around the core 6, an electromagnetic coil 4 wound around the bobbin 5, a shading coil 7 and a stationary yoke 8 arranged around the coil assembly and connected to the core. The valve unit 2 comprises a movable yoke 9 serving as a fluid passage switching member. One end of the movable yoke 9 is brought into contact with the stationary yoke 8 and is rotatably coupled therewith. In the other end of the movable yoke 9 there is formed a hole in which is inserted a rubber valve stopper 10. As clearly shown in FIG. 2, in a lower flange 25 of the coil bobbin 5, there is formed a first valve seat 13 which is communicated with a first fluid passage 15.

In the valve unit 2, there is formed a valve chamber 11 which is communicated with an output port 21 formed in the base unit 3 by means of a fluid passage not shown. In the valve chamber 11 there is arranged a second valve seat 12 which is communicated with an input port 20 formed in the base unit 3 via a second fluid passage a part of which is shown by a reference numeral 14 in FIG. 1. As illustrated in FIG. 1, the first valve seat 13, the rubber valve stopper 10 and the second valve seat 12 are aligned to each other. Therefore, when the movable yoke 9, i.e the fluid passage switching member is swingably moved, the valve seats 13 and 12 are selectively closed and opened. On a lower surface of the movable yoke 9 is arranged a leaf spring 16 which seaves to urge the one end of the movable yoke 9 against the other end of the stationary yoke 8. Between the first valve seat 13 and the other end of the movable yoke 9 is arranged a coiled spring 17 which serves to urge the rubber valve stopper 10 against the second valve seat 12 so as to close the second fluid passage 14.

Figure 2:
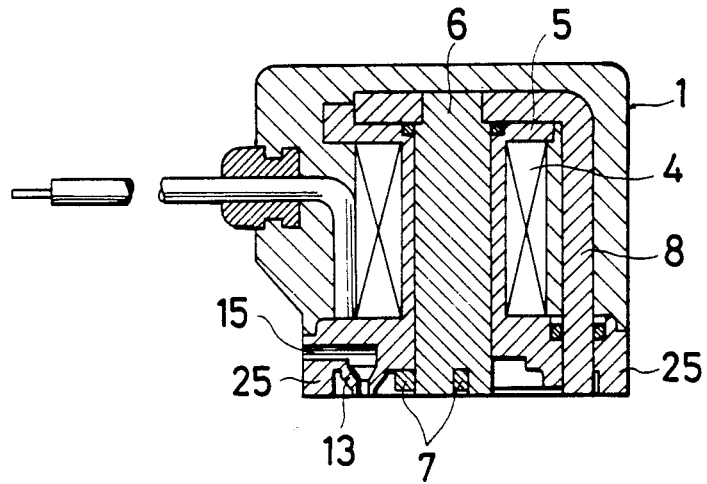
FIG. 2 is a cross section illustrating an electromagnetic unit of the valve shown in FIG. 1.

As shown in FIG. 2, a lower surface of the electromagnetic unit 1 is flattened. That is to say, the lower flange 25 of the coil bobbin 5, the lower end surface of the core 6 and the first valve seat 13 have a common flat surface. The electromagnetic unit 1, valve unit 2 and the base unit 3 are connected to each other by means of a suitable coupling means not shown.

Now the operation of the electromagnetic valve of the present embodiment will be explained. In a de-energized condition illustrated in FIG. 1, the movable yoke 9 is not attracted to the stationary yoke 8 and the rubber valve stopper 10 is pressed against the second valve seat 12 due to the force of the coil spring 17. Thus the second fluid passage 14 is closed. Contrary to this, the first valve seat 13 is opened and thus the first fluid passage 15 is communicated with the output port 21 by means of the valve chamber 11. That is to say, the output port 21 is communicated with the air.

Figure 3:
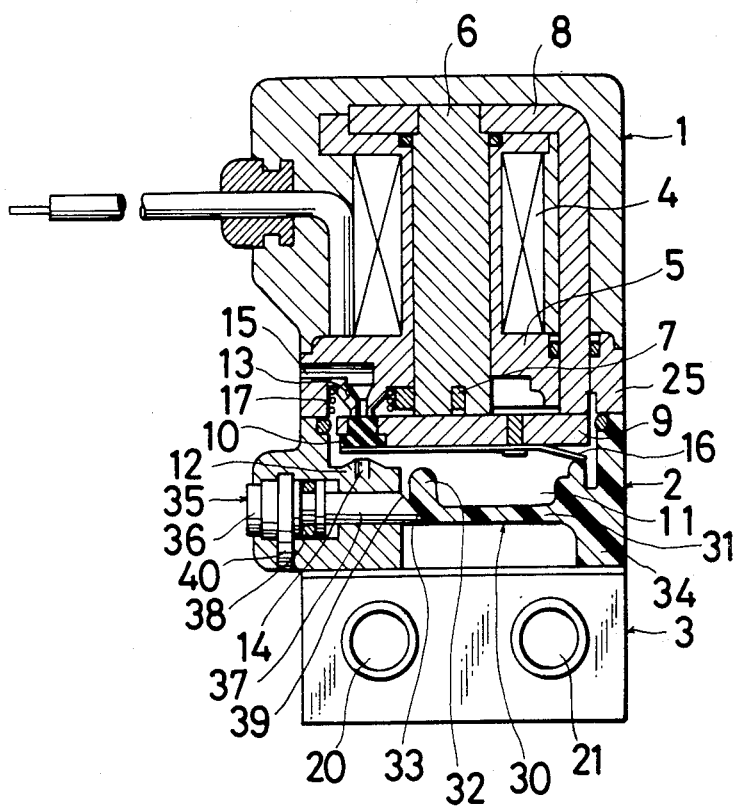
FIG. 3 is a cross section depicting the electromagnetic valve under an energized condition.

When the electromagnetic coil 14 is energized, the movable yoke 9 is attracted to the stationary yoke 8 against the force of the coil spring 17 as show in FIG. 3. Then the first valve seat 13 closed by the rubber valve stopper 10 and the first fluid passage 15 is isolated from the valve chamber 11. On the other hand, since the second valve seat 12 is opened, the second fluid passage 14 and thus the input port 20 are communicated with the output port 21 via the valve chamber 11. In this manner, by selectively energizing the electromagnetic coil 4, the output port 21 of the electromagnetic valve can be selectively communicated with the first or second fluid passages.

In a normal use, the electromagnetic valve is operated automatically, but in some cases it will be operated manually. To this end there is provided a manual switching means. As illustrated in FIG. 1, an arm 30 is provided in the valve chamber 11.

When a main body of the valve unit 2 is made of synthetic resin, the arm 30 may be formed integrally therewith. The arm 30 comprises a resilient portion 31, a projection 32 extending toward the movable yoke 9 and an inclined surface 33. In the present embodiment, a root portion 34 of the resilient portion 31 is integrally connected to a casing of the valve unit 2. In the side wall of the casing of the valve unit 2 there is formed a hole in which an operation member 35 is inserted slidably. The operation member 35 comprises a head portion 56 and a rod 37 having one end connected to the head portion 36 and the other end extended into the valve chamber 11. An end surface 39 of the rod 37 is inclined and is brought into contact with the inclined surface 33 of the arm 30. A seal member 38 is provided around the rod 37 and a stopper plate 40 is provided for preventing the operation member 35 from being pulled out of the valve unit 2.

Under the de-energized condition shown in FIG. 1, the movable yoke 9 is urged against the second valve seat 12 by means of the coil spring 17 and occupies the lower position. Therefore, the first valve seat 13 is opened and the first fluid passage 15 is communicated with the valve chamber 11, but since the second valve seat 12 is closed, the second fluid passage 14 and thus the supply port 20 are cut out of the valve chamber 11. Under such a condition, when the operation member 35 is pushed into the valve unit 2, the rod 37 is moved rightward and the arm 30 is forcedly moved upward against the force of the spring 17 and the resilient force of the arm itself due to the slidable engagement between the inclined surfaces 32 and 39. In this manner, the movable yoke 9 is manually moved upard. Then the first valve seat 13 is closed and the second valve seat 12 is opened, so that the supply port 20 is communicated with the output port 21. When the finger is removed from the operation member 35, the movable yoke 9 is returned into the lower position and the first valve seat 13 is opened and the second valve seat 12 is closed due to the force of the coil spring 17 and the resilient force of the arm 30.

Figure 4:
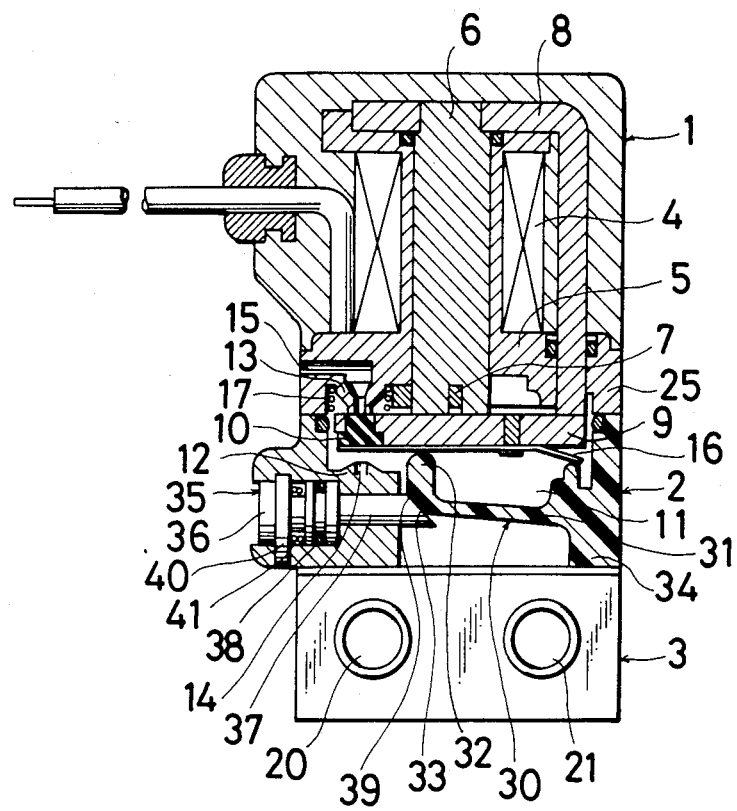
FIG. 4 is a cross section showing another embodiment of the electromagnetic valve according to the invention.

FIG. 4 is a cross section illustrating another embodiment of the electromagnetic valve according to the invention. In this embodiment, portions similar to those shown in the previous embodiment are denoted by the same reference numerals used in FIGS. 1 to 3. In the present embodiment, the position of the movable yoke 9 and thus the condition of the valve can be monitored from the external. As compared with the previous embodiment, in the present embodiment, there is arranged a relatively weak coil spring 41 between the stopper 40 and a ring 42 secured to the rod 37. Then the rod 37 is biased rightwardly by means of the spring 41. Therefore, when the electromagnetic coil 4 is energized and the movable yoke 9 is attracted to the core 6, the operation member 35 is also moved rightward in accordance with the rotational movement of the movable yoke 9. In this manner, when the movable yoke 9 is in the upper position, the head portion 36 of the operation member 35 is in a depressed position. When the coil 4 is de-energized, the movable yoke 9 is returned into the lower position due to the force of the coil spring 17 and the resilient portion 31 of the arm 30.

Then the operation member 35 is moved leftward against the spring force of the coil spring 41 and the head portion 36 is extruded as shown in FIG. 1.

In this manner, in the electromagnetic valve according to the present embodiment, the operator can monitor the position of the movable yoke 9 from the position of the head portion 36 of the operation member 35 from the outside. In the present embodiment, since the outer end of the first fluid passage 15 is opened to the air, the operator can know the pressure condition inside the valve chamber 11 with the aid of the operation member 35. That is to say, when the head portion 36 of operation member 35 is in the depressed position illustrated in FIG. 4, the pressure inside the valve chamber 11 is low and when the head portion 36 is in the protruded position shown in FIG. 1, the pressure is high. Therefore, the operator can confirm the operational condition of the electromagnetic valve accurately.

In the electromagnetic valve according to the present invention, since the first valve seat is formed in the coil bobbin of the electromagnetic unit, the number of components can be decreased and the construction becomes very simple. Further, since the lower ends of the core, stationary yoke and lower flanges of the coil bobbin are aligned in a flat plane, the setting and adjusting of the stroke of the movable yoke can be easily effected and thus the electromagnetic valve can be manufactured in a simple and less expensive manner. Moreover, if it is required to effect readjustment, it can be easily carried out by grinding the flat lower surface of the electromagnetic unit.

Furthermore, when the arm of the manual operation member is fromed integrally with the casing of the valve unit, the number of the components can be further reduced and the valve unit can be made small. When the weak coil spring is further provided in the operation member, the status and the pressure inside the valve chamber can be monitored from the outside.

The present invention is not limited to the embodiments explained above, but various modifications and alternations can be conceived by those skilled in the art within the scope of the invention.

What is claimed is:

1. An electromagnetic valve comprising:
   an electromagnetic unit having a magnetic core, a coil bobbin arranged around the core, an electromagnetic coil would around the coil bobbin, a stationary yoke having one end connected to one end of the core, a first valve seat formed in a flange of the coil bobbin and a first fluid passage communicated with the first valve seat, said stationary yoke and flange of said coil bobbin being aligned in a flat plane with saaid core; and a valve unit including a movable yoke arranged within a valve chamber and having one end rotatably coupled with the other end of the stationary yoke, a valve stopper provided in the other end of the movable yoke at a position opposed of the first valve seat, a second valve seat provided opposite to the valve stopper, a second fluid passage communicated with the second valve seat, a third fluid passage comunicated with the valve chamber and a resilient member for urging the valve stopper against the second valve seat to communicate the first fluid passage with the valve member, when the electromagnetic coil is de-energized; whereby when the electromagnetic coil is energized, the movable yoke is attracted to the core and the valve stopper is urged against the first valve seat to communicate the second fluid passage with the valve chamber.

2. An electromagnetic valve comprising:

an electromagnetic unit having a magnetic core, a coil bobbin arranged around the core, an electromagnetic coil wound around the coil bobbin, a statiionary yoke having one end connected to one end of the core, a first valve seat formed in aa flange of the coil bobbin and a first fluid passage communicated with the first valve seat; and a valve unit including a movable yoke arranged within a valve chamber and having one end rotatably coupled with the other end of the stationary yoke, a valve stopper provided in the other end of the movable yoke at a position opposed of the first valve seat, a second valve seat provided opposite to the valve stopper, a second fluid passage communicated with the second valve seat, a third fluid passage communicated with the valve chamber and a resilient member for urging the valve stopper against the second valve seat to communicate the first fluid passage with the valve chamber, when the electromagnetic coil is de-energized, said resilient member comprising a coil spring inserted between the flange of the coil bobbin and the movable yoke at a position of the first valve seat and the valve stopper; whereby when the electromagnetic coil is energized, the movable yoke is attracted to the core and the valve stopper is urged against the first valve seat to communicaate the second fluid passage with the valve chamber.

3. An electromagnetic valve according to claim 1, further comprising a base unit having a first port communicated with the second fluid passage and a second port communicated with the third fluid passage.

4. An electromagnetic valve comprising:

an electromagnetic unit having a magnetic core, a coil bobbin arranged around the core, an electromagnetic coil wound around the coil bobbin, a stationary yoke having one end connected to one end of the core, a first valve seat formed in a flange of the coil bobbin and a first fluid passage communicated with the first valve seat; and a valve unit including a movable yoke arranged within a valve chamber and having one end rotatably coupled with the other end of the stationary yoke, a valve stopper provided in the other end of the movable yoke at a position opposed of the first valve seat, a second valve seat provided opposite to the valve stopper, a second fluid passage communicated with the second valve seat, a third fluid passage communicated with the valve chamber, an operation member for moving manually the movable yoke toward the core to close the first valve seat by the valve stopper and a resilient member for urging the valve stopper against the second valve seat to communicate the first fluid passage with the valve chamber, when the electromagnetic coil is de-energized; whereby when the electromagnetic coil is energized, the movable yoke is attracted to the core and the valve stopper is urged against the first valve seat to communicate the second fluid passage with the valve chamber.

5. An electromagnetic valve according to claim 4, wherein said operation member comprises a rod movably inserted into the valve chamber and having an inclined end surface and a movable arm having inclined surface which is engaged with the inclined end surface of the rod and a projection which is engaged with the movable yoke, whereby when the rod is manually pushed into the valve unit the arm and thus the projection are moved toward the movable yoke to urge the valve stopper against the first valve seat.

6. An electromagnetic valve according to claim 5, wherein said arm is formed by resilient material.

7. An electromagnetic valve according to claim 6, wherein said arm is formed integrally with a casing of the valve unit made of plastic material.

8. An electromagnetic valve according to claim 6, wherein said operation member further comprises a weak coil spring for biasing the rod toward the inside of the valve unit, so that the rod is moved in accordance with the movement of the movable yoke to indicate the condition of the valve.

* * * * *